United States Patent [19]

Nishi et al.

[11] Patent Number: 5,026,227
[45] Date of Patent: Jun. 25, 1991

[54] CERMET SOLID END MILL

[75] Inventors: Masami Nishi, Kyoto; Kiyoshi Kishimoto, Osaka; Haruo Matsumoto, Osaka, all of Japan

[73] Assignee: Kyocera Corporation, Kyoto, Japan

[21] Appl. No.: 418,738

[22] Filed: Oct. 3, 1989

Related U.S. Application Data

[63] Continuation of Ser. No. 183,415, Apr. 18, 1988, abandoned, which is a continuation of Ser. No. 891,252, Jul. 28, 1986, abandoned.

[30] Foreign Application Priority Data

Aug. 30, 1985 [JP] Japan ............... 60-192257
Feb. 28, 1986 [JP] Japan ............... 61-44355

[51] Int. Cl.$^5$ .............................. B23C 5/16
[52] U.S. Cl. ...................... 407/119; 407/54; 407/63
[58] Field of Search ............ 407/119, 120, 53, 54, 407/63; 408/144; 144/221; 73/241, 242; 501/87, 96

[56] References Cited

U.S. PATENT DOCUMENTS

| | | | |
|---|---|---|---|
| 3,106,191 | 10/1963 | Newman | 407/63 |
| 3,362,802 | 1/1968 | Ellis | 75/242 |
| 3,514,828 | 6/1970 | Wale | 408/144 |
| 3,991,454 | 11/1976 | Wale | 408/144 |
| 4,046,517 | 9/1977 | Soga | 75/241 |
| 4,212,568 | 7/1980 | Minicozzi | 407/63 |
| 4,560,308 | 12/1985 | Deller | 407/63 |

FOREIGN PATENT DOCUMENTS

| | | | |
|---|---|---|---|
| 125917 | 9/1980 | Japan | 407/119 |
| 126945 | 8/1982 | Japan | 75/241 |
| 232711 | 12/1984 | Japan | 407/119 |

*Primary Examiner*—Frederick R. Schmidt
*Assistant Examiner*—Blynn Shideler
*Attorney, Agent, or Firm*—Spensley Horn Jubas & Lubitz

[57] ABSTRACT

A cermet solid end mill having a helix angle of 45 to 50 degrees and being composed essentially of NbC-TiC-TiN-based composition and being far superior to conventional end mills in cutting characteristics, i.e., cutting length, tool life and durability.

11 Claims, 1 Drawing Sheet

CERMET SOLID END MILL

This is a continuation of application Ser. No. 07/183,415 filed on Apr. 18, 1988, now abandoned, which was a continuation of application Ser. No. 06/891,252, filed on July 28, 1986, now abandoned.

1. FIELD OF THE INVENTION

The present invention relates to improvements in an end mill, and more particularly in a cermet solid end mill to be used for machine tools such as milling machines.

2. PRIOR ART

An end mill is a cutting tool with a relatively small diameter and is used for cutting at middle and high speeds. Therefore, it must have high hardness and toughness. Furthermore, since workpieces made of hard-to-cut materials having high hardness are frequently used these days, the end mill must have higher hardness. The conventional end mill made of high-speed steel is low in wear resistance although it is high in toughness. The wear resistance of an end mill made of cemented carbide (alloy) is higher than that of an end mill made of high-speed steel, but it is not enough. Accordingly these conventional end mills are not suited to cut workpieces made of hard materials at middle and high speeds. Cermet, which is as high as Cemented carbide in toughness and has high wear resistance, is more suited for an end mill material in physical properties than high speed steel and cemented carbide. In the conventional technology, however, cermet has been used only as a throw-away chip for an assembly end mill having a large diameter, and it was difficult to make an end mill having high helix cutting edges. Therefore, the cermet end mill made by the conventional technology was not well suited for milling and caused the problems of cutting edge chipping or breakage. Considering these situations, the inventors of the present invention proposed a cermet solid end mill having a helix angle of 40 to 50 degrees in the Japanese Patent Application Serial No. 60-192257 on Aug. 30, 1985 to improve the performance and to increase the application range of the cermet end mill. This prior invention could improve the strength of the cermet end mill by determining the helix angle to the range described above while keeping the high wear resistance of cermet. As a result, the tool life of the cermet solid end mill could be made far longer than that of the end mill made of cemented carbide.

SUMMARY OF THE INVENTION

The present invention, having the same objects as those of the prior invention, was devised to improve the prior invention. The inventors of the present invention found that the characteristics of the end mill of the prior invention could be more significantly delivered by using the cermet composition described below.

To achieve the purposes described above, the solid end mill of the present invention is made of cermet material composed essentially of a NbC-TiC-TiN-based cermet composition. The cutting edge of the solid end mill has a helix angle between 40 and 50 degrees. The resistance against wear and intermittent cutting of the NbC-TiC-TiN-based cermet composition of the present invention are equal to or higher than those of the conventional WC-based cemented carbide. Furthermore, the NbC-TiC-TiN-based cermet composition is superior to the conventional TiC-based cermet and TiN-based cermet in toughness. Therefore, the cermet solid end mill of the present invention can have a long tool life when used for milling. The present invention will become apparent by referring to the accompanying drawings and embodiments.

DETAILED DESCRIPTION OF THE PREFERRED EMBODIMENTS

Figure 1:
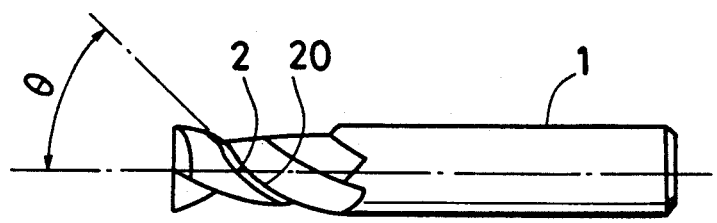
FIG. 1 is a side view of the end mill of the present invention.

FIG. 1 is a side view of the end mill of the present invention having two cutting edges. Numeral 1 designates a shank and numeral 2 designates a cutting part. A helix angle $\theta$ designates the angle of intersection between the axial line of the shank and a cutting edge 20 and is set in a range of 40 to 50 degrees in the present invention. In the case of ordinary end mills made of high-speed steel or cemented carbide, the helix angle $\theta$ is set in a range of 15 to 60 degrees (normally 25 to 35 degrees). As the angle $\theta$ decreases, the resistance against intermittent cutting increases, causing chipping and breakage. As the angle increases, the length of the cutting edge is longer and the cutting resistance does not change greatly. However, the edge becomes sharper and is apt to be broken. In the present invention, the angle $\theta$ is set to a relatively large value in a range of 40 to 50 degrees. By improving the toughness of the cermet composition, no problem occurs even when the angle is set at a relatively large value. Thus the end mill of the present invention can have longer cutting length and duration as confirmed by the test results described below. In addition, no chipping or breakage is caused, thus the end mill can have a far longer tool life.

Figure 2:
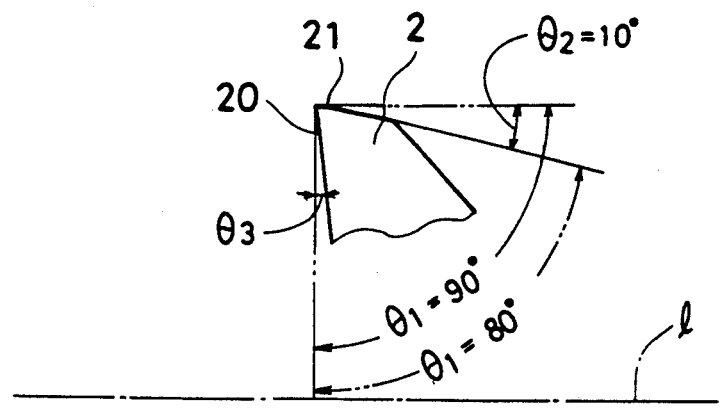
FIG. 2 is an enlarged view of the cutting edge section of the end mill.

The most preferred value of the angle is 45±2 degrees. Considering the practical cutting characteristics of an end mill, the angle should be in a range of 40 to 50 degrees, although there is no abrupt change in the cutting performance at the border angles of 40 and 50 degrees when the angle exceeds 50 degrees or decreases below 40 degrees. However, if the angle exceeds 50 degrees, the end mill has a reduced sectional area and is likely to be deformed by bending force. Accordingly, the end mill is apt to become detached from the machine. On the contrary, if the angle is less than 40 degrees, the end mill is apt to be chipped or broken. To prevent chipping and breakage, the preferred embodiment of the present invention has a feature in the structure of each cutting edge 2 as shown in FIG. 2. More particularly, a circular land section 21 is formed at the end of the cutting edge 2 so that cutting angle $\theta_1$ has a larger value. For example, when the circular land section 21 is formed so that the angle $\theta_1$ is 90 degrees when a rake angle $\theta_3$ is zero, the cutting angle $\theta_1$ is large and chipping hardly occurs. Without such a circular land section 21, the cutting angle $\theta_1$ is reduced by the rake angle $\theta_3$, thus the cutting angle $\theta_1$ becomes approximately 80 degrees. This may be apt to cause chipping. It is understood that the effect of the circular land section is more significant as the rake angle $\theta_3$ is larger and the cutting angle $\theta_1$ is smaller. The center of curvature of the circular land section 21 is on the axial line of the shank 1.

The cermet composition of the present invention will be explained below.

The cermet composition of the invention characteristically includes NbC. More particularly, the cermet is composed essentially of NbC (10 to 50%), TiC (10 to 40%), TiN (5 to 10%), WC (10 to 25%) and Mo$_2$C (5 to 20%). (These and the following are all weight percent values.)

An embodiment of the present invention has a hard material phase comprising NbC (50%), TiC (10%), TiN (5%), WC (10%) and Mo$_2$C (5%), and a metal phase comprising Ni or Co or an alloy of Ni and Co. A part of NbC can be replaced with TaC to further improve the toughness of the embodiment. The cermet composition whose hard material phase is mainly composed of NbC is equal or superior to the conventional WC-based cemented carbide in resistance against wear and intermittent cutting. In addition, the toughness of the cermet composition is higher than that of the TiC-TiN-based cermet. Table 1 below shows the physical properties of the cermet composition embodiments of the present invention compared with contrast examples.

(a) Physical characteristics (TABLE 1)

| Physical properties | Unit | Contrast example 1 | Contrast example 2 | Embodiment 1 | Embodiment 2 |
|---|---|---|---|---|---|
| Apparent specific gravity | — | 14.0 | 6.0 | 7.7 | 8.1 |
| Vickers hardness | kg/mm$^2$ | 1550 | 1650 | 1450 | 1500 |
| Rockwell hardness | kg/mm$^2$ | 92.4 | 92.5 | 91.5 | 92 |
| Bending strength | kg/mm$^2$ | 180 | 160 | 190 | 170 |
| Young's modulus | kg/cm$^2$ ($\times 10^6$) | 6.4 | 4.4 | 4.2 | 4.3 |
| Coefficient of linear expansion (40–400° C.) | | 7.4 | — | 7.8 | 7.90 |
| (40–800° C.) | 1/°C. ($\times 10^6$) | — | 8.5 | — | 8.70 |
| Heat transfer rate | cal.cm/cm$^2$sec.°C. | 0.26 | 0.03 | 0.03 | 0.02 |
| Fracture toughness | MN/m$^{\frac{3}{2}}$ | 9.5 | 9.0 | 9.5 | 10.5 |

Contrast example 1 is a cemented carbide alloy called K10, composed of WC and Co. Contrast example 2 is a TiN-based cermet. Embodiment 1 is composed of NbC (30%), TiC (20%), TiN (5%), WC (15%) and Mo$_2$C (15%). Embodiment 2 is the same as embodiment 1 except that 50% of NbC (30%) included in embodiment 2 is replaced with TaC. According to Table 1, the Vickers hardness values of embodiments 1 and 2 exceed 1400 and the fracture toughness values of embodiments 1 and 2 are 9.5 or more. It is understood that the embodiments 1 and 2 are equal to contrast examples 1 and 2 in hardness and superior to them in fracture toughness. According to other experiments conducted by the inventors, it was already known that a cermet composition had less wear resistance if its Vickers hardness value was less than 1400 and it had less resistance against chipping if its hardness value exceeded 1550. Thus the ideal Vickers hardness range should be between 1400 and 1550. In addition, it was already known that resistance against chipping was apt to drop if the fracture toughness of the cermet composition was less than 9.0. However, the hardness and fracture toughness of the cermet composition of the present invention are not strictly restricted by these ranges.

Although contrast example 1 made of a cemented carbide alloy is high in hardness and fracture toughness, it wears when used to mill steel workpieces. This is well known to those people ordinarily skilled in the art. Contrast example 2 has higher hardness and its wear resistance is further improved. However, its resistance against chipping is lower. Therefore, it is impossible to generally judge the suitability of end mills only by their physical properties.

The cutting performance test described below was conducted to clarify the suitability of end mills. (b) Cutting performance test Table 2 shows the results of a normal speed milling test and Table 3 shows the results of a high speed milling test using the end mills made of the test pieces listed in Table 1. In the cutting performance test, the cermet which had the same composition as that of embodiment 1 but had a helix angle slightly beyond the range specified by the present invention was tested as experimental example 1, and the cermet which had the same composition as that of embodiment 2 but had a helix angle slightly beyond the range specified by the present invention was tested as experimental example 2. In the same way, the inventors also tested the cermet which had the same composition as that of contrast example 1 but had a helix angle slightly beyond the range specified by the present invention.

(TABLE 2)

| | Factor | | | |
|---|---|---|---|---|
| Test piece | Helix angle ($\theta$) | Cutting length (m) | Tool life (Minute) | Condition after cutting |
| Experimental example 1 | 30° | 21.4 | 160 | Breakage |
| Embodiment 1 | 45° | 37.0 | 278 | Wear |
| Experimental example 2 | 30° | 20.6 | 154 | Chipping |
| Embodiment 2 | 45° | 53.0 | 398 | Wear |
| Contrast example 1 | 30° | 3.6 | 27 | Wear |
| | 45° | 37.0 | 278 | Chipping |
| Contrast | 30° | 0.4 | 3 | Chipping |

(TABLE 2)-continued

| Test piece | Helix angle ($\theta$) | Cutting length (m) | Tool life (Minute) | Condition after cutting |
| --- | --- | --- | --- | --- |
| example 2 | — | — | — | — |

Note:
End mill dimensions: $\phi 6 \times 13$ mm, with two flutes
Workpiece material: Hot working tool steel having a content of H13 (AISI Standard)
Workpiece hardness: HRC 43
Spindle rotational speed: 1800 rpm
Feed: 133 mm/minute
Depth of cut: $5 \times 1$ mm

TABLE 3

| Test piece | Helix angle ($\theta$) | Cutting length (m) | Tool life (Minute) | Condition after cutting |
| --- | --- | --- | --- | --- |
| Experimental example 1 | 30° | 14.6 | 49 | Breakage |
| Embodiment 1 | 45° | 29.4 | 99 | Wear |
| Experimental example 2 | 30° | 27.3 | 80 | Chipping |
| Embodiment 2 | 45° | 42.0 | 141 | Wear |
| Contrast example 1 | 30° | 24.0 | 81 | Chipping |
| | 45° | 24.0 | 81 | Chipping |
| Contrast example 2 | 30° | 1.1 | 4 | Chipping |
| | — | — | — | — |

Note:
End mill dimensions: $\phi 6 \times 13$ mm, with two flutes
Workpiece material: Hot working tool steel having a content of H13 (AISI Standard)
Workpiece hardness: HRC 43
Spindle rotational speed: 4000 rpm
Feed: 296 mm/minute
Depth of cut: $5 \times 1$ mm (c) Observation (a) According to the milling test at the normal speed (Table 2), experimental examples 1 and 2 caused breakage and chipping respectively, thus they were found to be improper. Embodiments 1 and 2 were found to be applicable to practical use since they caused only wear. In addition, embodiments 1 and 2 were superior both in cutting length (37 to 53 m) and tool life (278 to approximately 400 minutes). In particular, the cutting length and tool life of embodiment 2 are approximately more than twice those of experimental example 1.

(b) Even though contrast example 1 having an angle of torsion of $\theta = 30$ degrees can be used for cutting, it is obvious that its cutting length and tool life are significantly less than those of embodiments 1 and 2. Contrast example 1 having $\theta = 45$ degrees caused chipping. Contrast example 2 also caused chipping. The cutting length and time of contrast example 2 are very small.

(c) In the milling test at the high speed (Table 3), the results similar to those shown in Table 2 were obtained. It is evident that embodiments 1 and 2 are far superior to contrast examples 1 and 2. In particular, embodiment 2 is found to be the best. Contrast 1 having $\theta = 30$ degrees is durable but is far behind embodiments 1 and 2 in cutting length and tool life in the same manner as shown in Table 2. Contrast example 1 having $\theta = 45$ degrees and contrast example 2 caused chipping.

Figure 3:
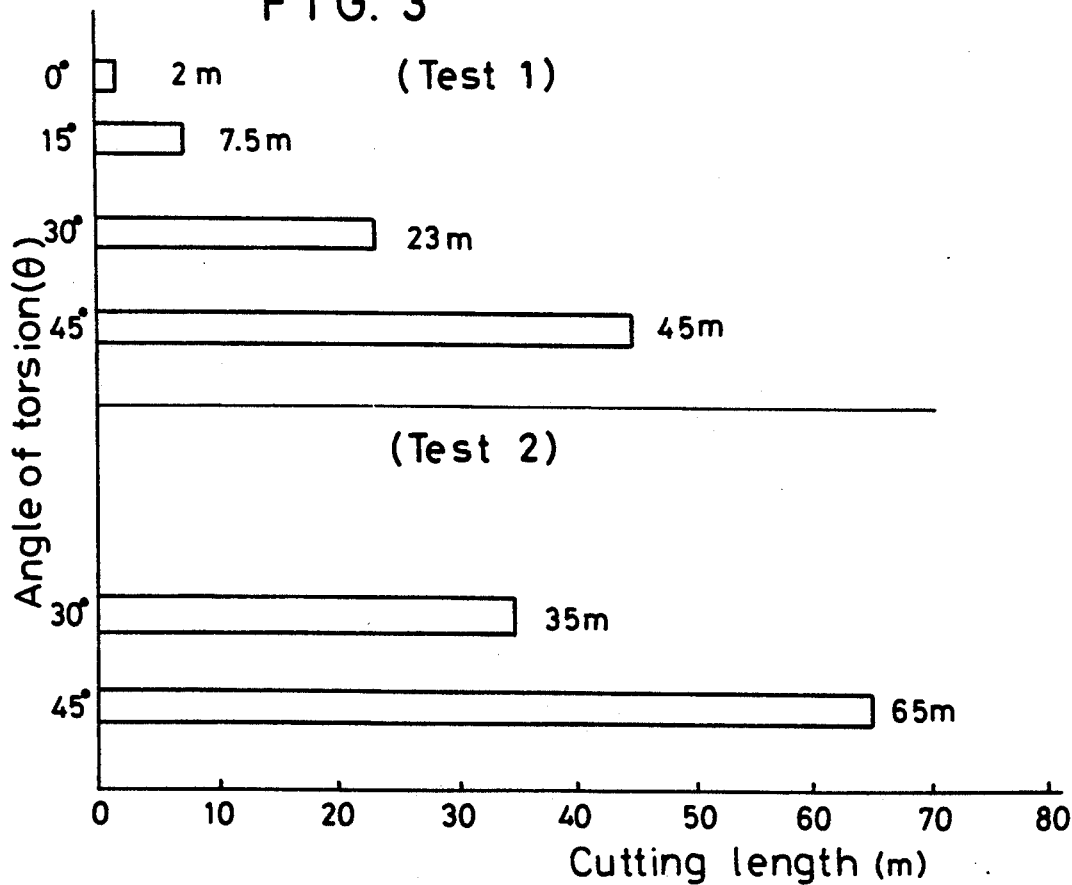
FIG. 3 is a graph indicating the relationship between the helix angle and the cutting length of the second embodiment of the present invention.

(d) Additional test of the cermet composition of embodiment 2: FIG. 3 shows how the cutting length (m) of the cermet composition of embodiment 2 changes as its helix angle varies. Note that only the helix angle of $\theta = 45$ degrees conforms to the range of the present invention. The test was conducted under the following conditions.

Test 1

End mill dimensions: $\phi 6 \times 13$ mm, with two flutes
Workpiece material: Hot working tool steel having a content of H13 (AISI Standard)
Workpiece hardness: HRC 43
Spindle rotational speed: 4000 rpm
Feed: 296 mm/minute
Depth of cut: $5 \times 1$ mm Test 2

End mill dimensions: $\phi 6 \times 13$ mm, 2 flutes
Workpiece material: Prehardened steel
Workpiece hardness: HRC40
Spindle rotational speed: 2650 rpm
Feed: 265 mm/minute
Depth of cut: $9 \times 2$ mm In the graph the ordinate and abscissa are commonly used for convenience.

(e) Consideration:

As shown in FIG. 3, the cermet end mill having $\theta = 45$ degrees achieved the longest cutting length at high speed and normal speed. This indicates that the cermet end mill is superior in cutting performance. As understood by reference to the above descriptions, the cermet solid end mill having a helix angle of 45 to 50 degrees and the NbC-TiC-TiN-based composition is used in the present invention so that these two technical factors mutually potentiate. As a result, the cutting characteristics, i.e., cutting length, tool life and durability of the cermet solid end mill of the present invention are far superior to those of the conventional end mills. Therefore, the cermet solid end mill of the present invention can greatly improve the performance and increase the application range of the end mill of the prior invention.

We claim:

1. A solid end mill comprising a generally cylindrical body having a central axis, a shank portion and a cutting portion attached to said shank portion, said cutting portion comprising at least one helically extending cutting edge, wherein said at least one cutting edge has a helix angle in the range of about 40 to 50 degrees, said solid end mill consisting essentially of an NbC-TaC-TiC-TiN-WC-Mo$_2$C-based cermet composition comprising from greater than 0 percent to up to 50 weight percent of NbC in admixture with TaC, TiC, TiN, WC, Mo$_2$C and a metal phase which is an alloy of Ni and Co.

2. A solid end mill comprising a generally cylindrical body having a central axis, a shank portion and a cutting portion attached to said shank portion, said cutting portion comprising at least one helically extending cutting edge, wherein said at least one cutting edge has a helix angle in the range of about 40 to 50 degrees, said solid end mill consisting essentially of a NbC-TaC-TiC-TiN-based cermet composition comprising from greater than 0 greater to up to 50 weight percent of NbC in admixture with TaC, TiC and TiN.

3. A mill according to claim 2, wherein said helix angle is 45±2 degrees.

4. A mill according to claim 2, wherein a circular land section is provided at an end of said cutting portion distal from said shank portion to increase a cutting angle at said end of said cutting portion.

5. A mill according to claim 4, wherein said cutting angle is approximately 90 degrees.

6. A mill according to claim 2, wherein said cermet composition further comprises: WC; and Mo$_2$C.

7. A mill according to claim 6, wherein the cermet composition includes 15% NbC, 15% TaC, 20% TiC, 5% TiN, 15% WC and 15% Mo$_2$C.

8. A mill according to claim 6, wherein said cermet composition comprises: 10 to 50 weight-% NbC in admixture with TaC; 10 to 40 weight-% TiC; 5 to 10 weight-% TiN; 10 to 25 weight-% WC; and 5 to 20 weight-% Mo$_2$C.

9. A mill according to claim 6, wherein said cermet composition further comprises a metal phase which is Ni, Co or an alloy of Ni and Co.

10. A mill according to claim 9, wherein said cermet composition comprises: about 50 weight-% NbC in admixture with TaC; about 10 weight-% TiC; about 5 weight-% TiN; about 10 weight-% WC; about 5 weight-% Mo$_2$C; and about 20 weight-% of said metal phase.

11. A mill according to claim 9, wherein said cermet composition comprises: about 30 weight-% NbC in admixture with TaC; about 20 weight-% TiC; about 5 weight-% TiN; about 15 weight-% WC; about 15 weight-% Mo$_2$C; and about 15 weight-% of said metal phase.

* * * * *